United States Patent [19]
Yamawaki

[11] Patent Number: 5,987,630
[45] Date of Patent: Nov. 16, 1999

[54] METHOD OF DESCRAMBLING SCRAMBLED DATA USING A SCRAMBLE PATTERN AND SCRAMBLE PATTERN GENERATOR

[75] Inventor: Masashi Yamawaki, Kasugai, Japan

[73] Assignee: Fujitsu Limited, Kanagawa, Japan

[21] Appl. No.: 08/874,673

[22] Filed: Jun. 13, 1997

[30] Foreign Application Priority Data

Nov. 12, 1996 [JP] Japan ................................. 8-300645

[51] Int. Cl.⁶ .......................... H03M 7/00; G11B 20/14
[52] U.S. Cl. ........................ 714/701; 341/50; 341/93; 369/59
[58] Field of Search ..................... 380/48, 50; 371/2.1; 369/59; 360/39, 48; 341/50, 93

[56] References Cited

U.S. PATENT DOCUMENTS

| | | | |
|---|---|---|---|
| 5,031,129 | 7/1991 | Powell et al. | 364/717 |
| 5,241,602 | 8/1993 | Lee et al. | 380/44 |
| 5,661,707 | 8/1997 | Matsui | 369/59 |
| 5,732,066 | 3/1998 | Moriya et al. | 369/275.3 |

OTHER PUBLICATIONS

Millman et al., "Microelectronics", 2nd edition, McGraw–Hill Book Co., p. 329, Dec. 1987.

*Primary Examiner*—Stephen M. Baker
*Attorney, Agent, or Firm*—Nikaido Marmelstein Murray & Oram LLP

[57] ABSTRACT

A descrambling method is suitable for improving the data transfer rate and fast data processing separate scrambled data into a plurality of data groups each including plural pieces of scrambled unit data. Initial scramble patterns are respectively assigned to the data groups. An initial scramble pattern is prepared and assigned to a specific data group. A first scramble pattern is generated in one clock cycle using the prepared initial scramble pattern and then one of the scrambled unit data pieces in the specific data group is prepared. A descrambling operation using the first scramble pattern and the prepared one scrambled unit data piece is then performed to produce an original data piece.

18 Claims, 8 Drawing Sheets

| ID value (h) (b7–b4) | 0 | 1 | 2 | 3 | 4 | 5 | 6 | 7 |
|---|---|---|---|---|---|---|---|---|
| Initial value α (h) | 0001 | 5500 | 0002 | 2A00 | 0004 | 5400 | 0008 | 2800 |

| | 8 | 9 | A | B | C | D | E | F |
|---|---|---|---|---|---|---|---|---|
| | 0010 | 5000 | 0020 | 2001 | 0040 | 4002 | 0080 | 0005 |

| ID value (h) (b7-b4) | α (h) | 0 | 1 | 2 | 3 | 4 | 5 | 6 | 7 | 8 | 9 | A | B | C | D | E | F |
|---|---|---|---|---|---|---|---|---|---|---|---|---|---|---|---|---|---|
| 0000 address | α1 (h) | 0001 | 5500 | 0002 | 2A00 | 0004 | 5400 | 0008 | 2800 | 0010 | 5000 | 0020 | 2001 | 0040 | 4002 | 0080 | 0005 |
| 0512 address | α2 (h) | 33FC | 33F8 | 67F8 | 67F0 | 4FF0 | 4FE0 | 1FE0 | 1FC0 | 3FC1 | 3F81 | 7F83 | 7F03 | 7F06 | 7E06 | 7E0C | 7C0C |
| 1024 address | α3 (h) | 7FF0 | 3000 | 7FE0 | 6000 | 7FC0 | 4001 | 7F80 | 0003 | 7F00 | 0006 | 7E00 | 000C | 7C00 | 0018 | 7800 | 0030 |
| 1536 address | α4 (h) | 1540 | 6AB0 | 2A81 | 5501 | 5502 | 2A02 | 2A04 | 5404 | 5408 | 2808 | 2810 | 5010 | 5020 | 2021 | 2041 | 4042 |

METHOD OF DESCRAMBLING SCRAMBLED DATA USING A SCRAMBLE PATTERN AND SCRAMBLE PATTERN GENERATOR

BACKGROUND OF THE INVENTION

1. Field of the Invention

The present invention generally relates to a method of descrambling scrambled data using a scramble pattern. More particularly, this invention relates to a method of descrambling scrambled data recorded on a recording medium in a disk apparatus, and a circuit for generating a scramble pattern.

2. Description of the Related Art

Since digital video disk (DVD) media promises large-capacity, individual makers are trying to develop DVD systems. Recently, enthusiastic efforts have been, and are being, made to standardize the DVD specifications.

Figure 1:
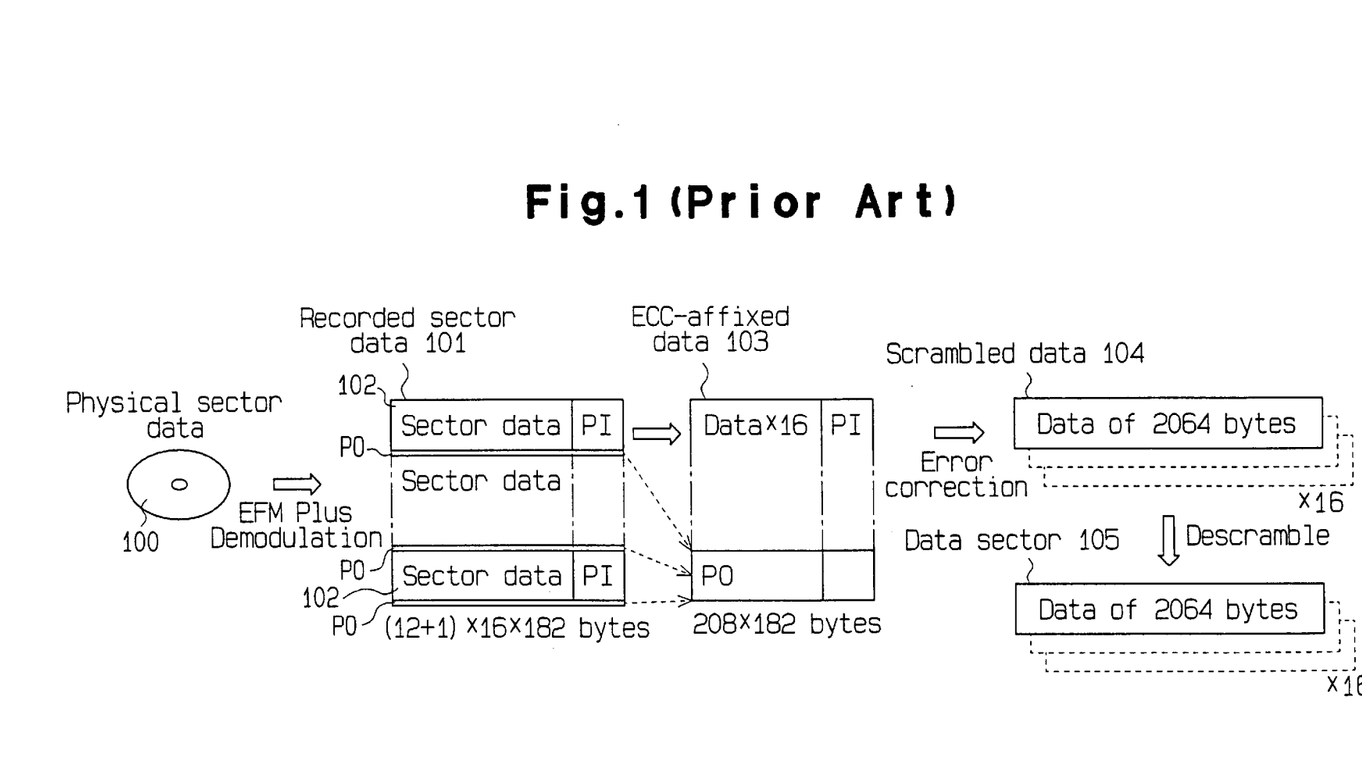
FIG. 1 is a flow illustrating a typical data demodulating process in a read-only DVD drive.

FIG. 1 presents a flow diagram showing a data demodulating process in a DVD drive designed exclusively to read data. A disk 100 has data recording tracks arranged in a spiral form. Physical sector data is recorded on each track in a sector by sector manner. Physical sector data read from the disk 100 is subjected to EFM (Eight to Fourteen Modulation) Plus demodulation to yield recorded sector data 101. The recorded sector data 101 includes plural pieces of sector data 102, plural pieces of first error correction code (ECC) data PI affixed to the individual row data in the sector data 102, and plural pieces of second error correction code data PO affixed to the individual column data in the sector data 102. The data are recorded on the disk 100 in the order of the sector data 102, the first error correction codes PI and the second error correction codes PO.

Sixteen pieces of sector data 102, sixteen first error correction codes PI and sixteen second error correction codes PO are grouped in the recording order, thus yielding ECC-affixed data 103. Sixteen pieces of sector data 102 form one block.

Error correction is performed on one block of sector data 102 using the first error correction codes PI. Then, error correction is performed on one block of sector data 102 using the second error correction codes PO. In this manner, sixteen pieces of scrambled data 104 are generated. Each scrambled data 104 is data generated by performing an exclusive OR operation on the original data and a scramble pattern.

To generate sixteen pieces of original sector data 105, an exclusive OR operation on each scrambled data 104 and a scramble pattern used for the generation of each scrambled data 104, or descrambling, is executed.

Figure 2:
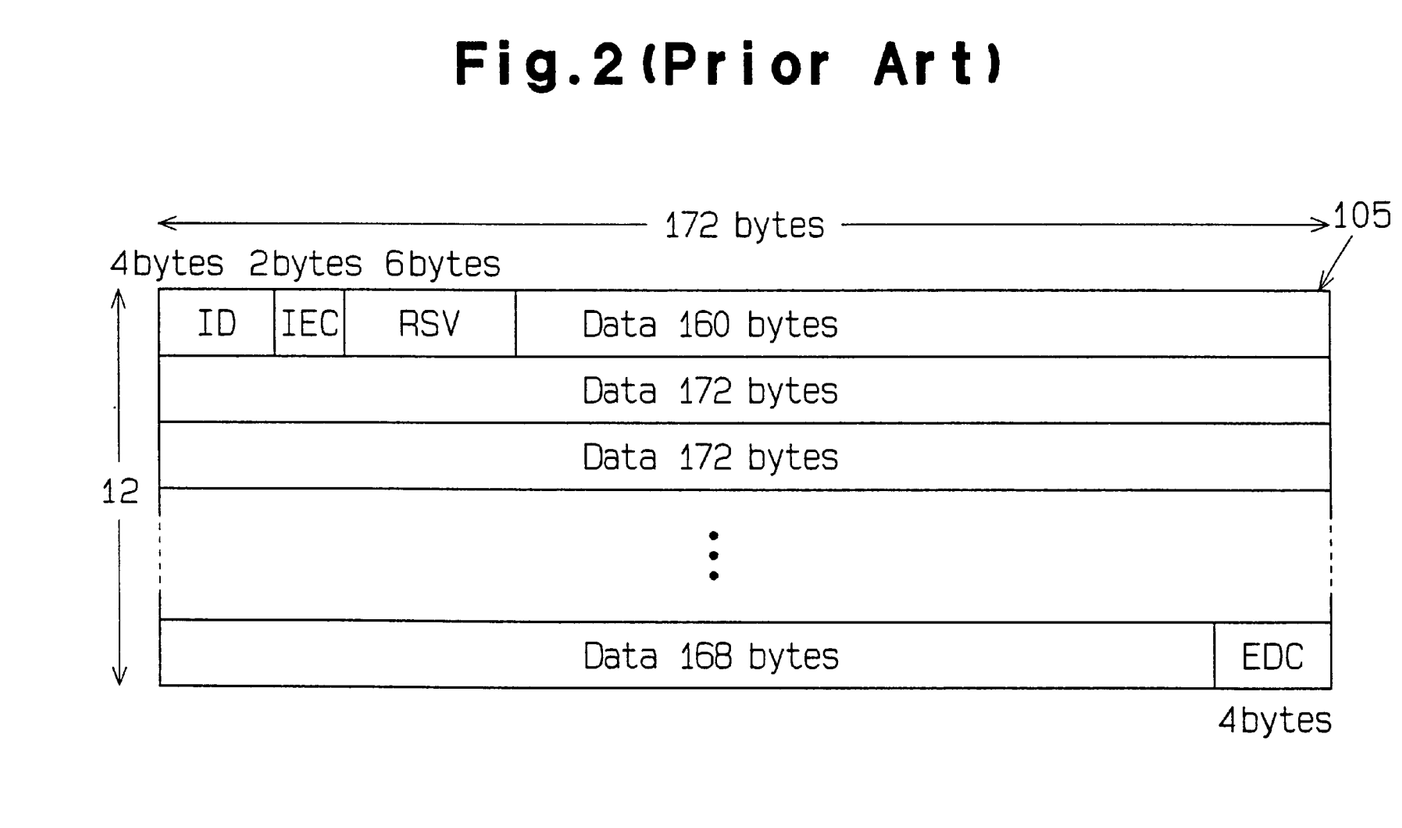
FIG. 2 shows the format of a data sector on a DVD.

As shown in FIG. 2, sector data 105 includes main data of 2048 (2K) bytes, 4-byte identification data ID, a 2-byte error correction code IEC for the identification data ID and a 6-byte reserve area RSV, all of the latter three being affixed to the front portion of the main data. The sector data 105 further includes a 4-byte error correction code EDC, which is affixed to the end portion of the main data to detect an error in the main data. The identification data ID includes a 1-byte sector information field and a 3-byte sector number field.

Figure 3:
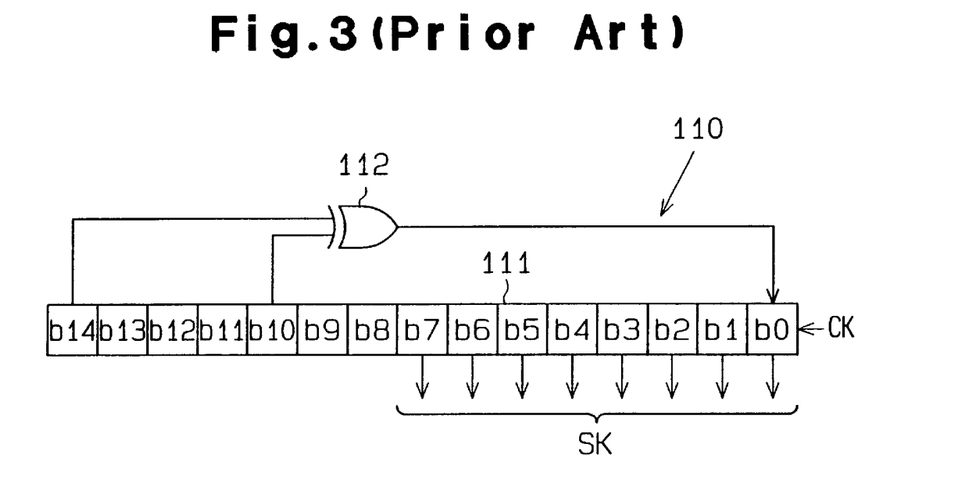
FIG. 3 is a circuit diagram showing a conventional scramble pattern generator which is used to descramble scrambled data.

FIG. 3 shows a conventional scramble pattern generator 110 which is used to descramble scrambled data. The scramble pattern generator 110 includes a feedback type shift register 111 of fifteen bits b14 to b0, and an exclusive OR (EOR) gate 112.

The EOR gate 112 receives the logic values of the bits b14 and b10 and performs an exclusive OR operation thereon. The resultant logic value is supplied to the bit b0. The shift register 111 receives an initial scramble pattern in response to the first pulse of a clock CK. The shift register 111 further successively shifts the logic values of the bits b13–b0 to the adjoining bits b14–b1, respectively, every time each pulse of the clock CK is input. The shift register 111 receives the output logic value of the EOR gate 112 at its bit b0 and outputs the logic values of the bits b7–b0 as an 8-bit scramble value SK for every eight pulses of the clock CK.

Figure 4:
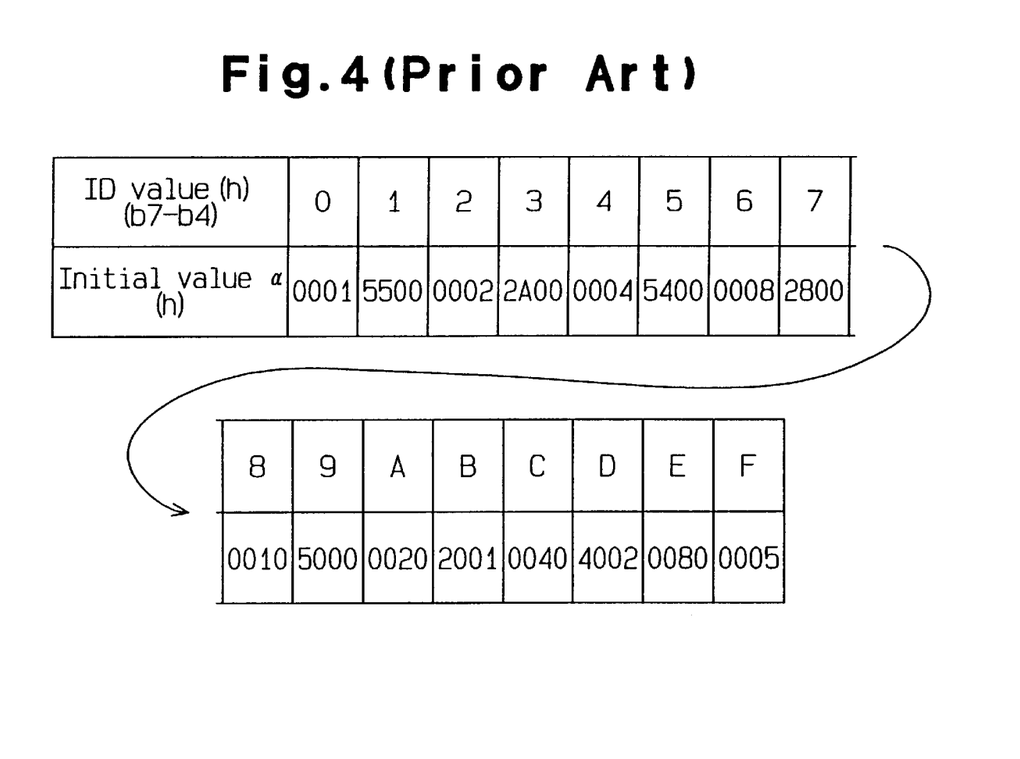
FIG. 4 shows an initial scramble pattern to be supplied to the scramble pattern generator in FIG. 3.

As shown in FIG. 4, the initial value of a scramble pattern is determined by the ID value of the bits b7–b4, which is assigned to the sector number field of the identification data ID. That is, one initial pattern is assigned to one block formed by sixteen data sectors. When the ID value "0(h)" ((h): a hexadecimal notation) of the bits b7–b4 is assigned to the sector number field, for example, in the first block, the initial scramble pattern "0001(h)" is determined. At this time, 000000000000001(2) ((2): a binary notation) is set in the bits b14–b0 of the shift register 111. Accordingly, the logic value 00000001(2) of the bits b7–b0 is output as the initial 8-bit scramble value SK from the shift register 111.

An exclusive OR operation on the initial 8-bit scramble value SK and the first 8-bit main data of the scrambled data 104 is performed to generate 1-byte original data. The next 1-byte main data is descrambled using 8-bit scramble value SK outputted from the shift register 111 after receiving eight pulses of the clock CK.

Since the conventional scramble pattern generator 110 acquires an 8-bit scramble value SK from the shift register 111 in accordance with the transfer rate of main data, it requires the clock CK, the frequency of which is eight times the transfer rate of main data. When the transfer rate of main data is set to 10 Mbytes/sec, for example, the scramble pattern generator 110 needs a clock CK that has a frequency of 80 megahertz (MHz). The high frequency of the clock CK stands in the way of improving the transfer rate of main data and fast data processing.

The last data of the data sector 105, or the 2048th data, is descrambled by using an 8-bit scramble pattern, which has been generated by the input of 2047×8 clock pulses to the shift register 111. In other words, the 2048th data is acquired only after 2047×8 clock pulses are input to the shift register 111. Furthermore, when the shift register 111 inputs 1023×8 clock pulses, descrambling 1024-byte data is obtained using a corresponding 8-bit scramble pattern. It is therefore not possible to acquire the desired original byte data immediately after the descrambling operation is initiated. This obstructs fast data processing.

SUMMARY OF THE INVENTION

Broadly speaking, the present invention relates to a descrambling method and a scramble pattern generator suitable for improving the data transfer rate and fast data processing. The present invention can be implemented in numerous ways including as an apparatus and a method.

In one embodiment of the invention, a method is described that generates original data by descrambling scrambled data using predetermined scramble patterns. The scrambled data is separated into a plurality of data groups each including plural pieces of scrambled unit data. Initial scramble patterns are respectively assigned to the data groups. The method includes the steps of: (a) preparing an initial scramble pattern assigned to a specific data group; (b) generating a first scramble pattern by one clock cycle using the prepared initial scramble pattern; (c) preparing one of the scrambled unit data pieces in the specific data group; and (d) performing a descrambling operation using the first scramble pattern and the prepared one scrambled unit data piece to produce an original data piece.

Another aspect of the invention, a method is described that generates original data by descrambling scrambled data using predetermined scramble patterns. The scrambled data is separated into to a plurality of data groups each including plural pieces of scrambled unit data including first and second scrambled unit data. Initial scramble patterns are respectively assigned to the data groups. The method includes the steps of: (a) preparing an initial scramble pattern assigned to a specific data group; (b) generating a first plurality of scramble patterns including first and second scramble patterns by one clock cycle using the prepared initial scramble pattern; (c) preparing plural pieces of scrambled unit data including first and second ones of the scrambled unit data pieces in the specific data group; and (d) performing a first plurality of descrambling operations including first and second descrambling operations to simultaneously produce plural pieces of original data including first and second original data pieces. The first descrambling operation is performed using the first scramble pattern and the first scrambled unit data piece to produce the first original data piece. The second descrambling operation is performed using the second scramble pattern and the second scrambled unit data piece to produce the second original data piece.

Yet another aspect of the invention, a method is described that generates original data by descrambling scrambled data using predetermined scramble patterns. The scrambled data is separated into a plurality of data groups each including plural pieces of scrambled unit data. A position for each of the pieces of scrambled unit data in one data group is defined. A plurality of initial scramble patterns being respectively assigned to predetermined selected positions in one data group. The method includes the steps of: (a) specifying a first position for one scrambled unit data in a data group, the first position being a position at which descrambling one scrambled unit data piece should be started; (b) selecting one initial scramble pattern, associated with the specified first position, in the plurality of initial scramble patterns; (c) generating a first scramble pattern using the selected one initial scramble pattern; (d) preparing one scrambled unit data piece corresponding to the specified first position; and (e) performing a descrambling operation using the first scramble pattern and the prepared one scrambled unit data piece to produce an original data piece.

Another aspect of the invention, a circuit is described that generates scramble patterns used in descrambling scrambled data. The scrambled data is separated into a plurality of data groups. Initial scramble patterns are respectively assigned to the data groups. The circuit includes: a plurality of registers for receiving an initial scramble pattern assigned to a specific data group and for temporally holding the initial scramble pattern to output the initial scramble pattern as a first scramble pattern; a first logic circuit, coupled to the plurality of registers, for receiving the first scramble pattern to generate a second scramble pattern and for providing the second scramble pattern to the plurality of registers. The plurality of registers selectively receives one of the initial scramble pattern and second scramble pattern and outputs a selected pattern as the first scramble pattern.

Yet another aspect of the invention, a disk apparatus includes: the circuit for generating scramble patterns; a data processing apparatus for providing the initial scramble pattern and the scrambled data to the circuit; and a descrambler circuit, coupled to the data processing apparatus and the plurality of registers of the circuit, for receiving the scrambled data and the first scramble pattern and for performing a descrambling operation using the scrambled data and the first scramble pattern to produce original data.

Other aspects and advantages of the invention will become apparent from the following description, taken in conjunction with the accompanying drawings, illustrating by way of example the principals of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

Figure 5:
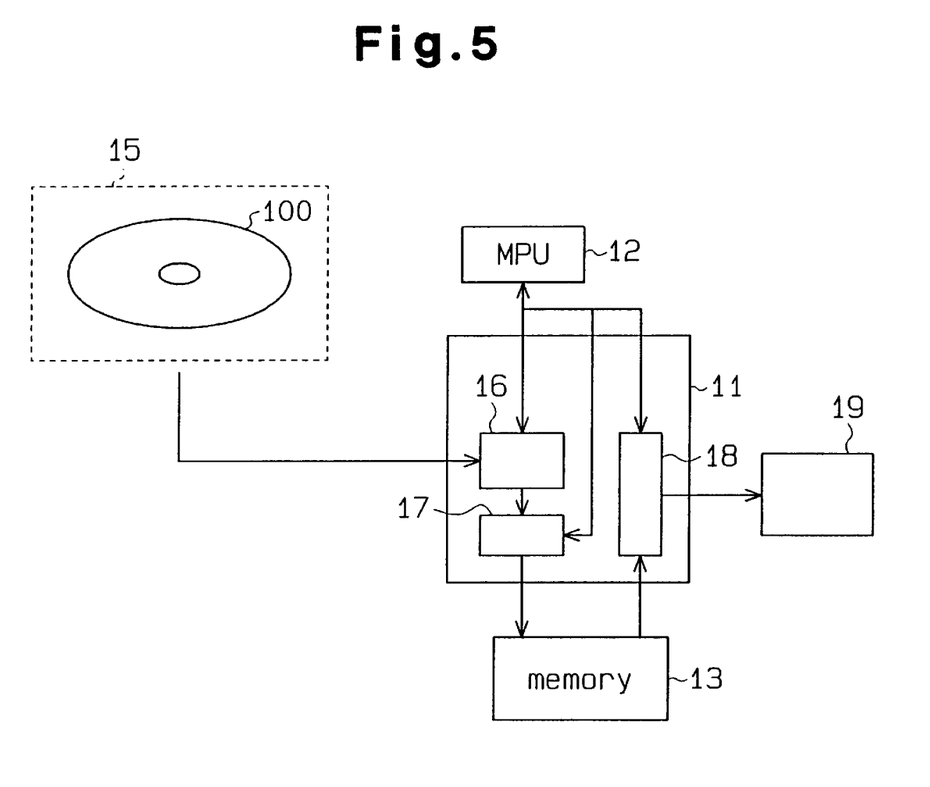
FIG. 5 is a schematic block diagram illustrating a DVD drive according to a first embodiment of the invention.

A DVD drive according to a first embodiment of the present invention will now be described referring to the accompanying drawings. As shown in FIG. 5, a DVD drive 10 comprises a DVD controller 11, a microprocessor unit (MPU) 12, a semiconductor memory 13 including a DRAM or SRAM, and a disk drive 15. The disk drive 15 reads data recorded on a disk 100 and performs EFM Plus demodulation on the read data to yield recorded sector data 101. The recorded sector data 101 is supplied to the DVD controller 11. The DVD controller 11 is configured to perform predetermined data processing on the recorded sector data 101 and to store processed data into the semiconductor memory 13 in accordance with a control signal from the MPU 12 The DVD controller 11 is connected between the disk drive 15 and an external computer 19 and includes a data processor 16, a data reproducing circuit 17 and a transfer controller 18 all connected to the MPU 12.

In accordance with a control signal from the MPU 12, the data processor 16 groups sixteen pieces of sector data 102, sixteen first error correction codes PI and sixteen second error correction codes PO in the recording order, yielding ECC-affixed data 103 (see FIG. 1). In accordance with another control signal from the MPU 12, the data processor 16 executes error correction of one block sector data 102 using the first and second error correction codes PI and PO in the ECC-affixed data 103, producing sixteen pieces of scrambled data 104.

In accordance with a control signal from the MPU 12, the data reproducing circuit 17 performs an exclusive OR operation on the scrambled data 104, generated by the data processor 16, and a scramble pattern to form a data sector 105 and supplies the data sector 105 to the semiconductor memory 13. According to the first embodiment, the main data of the scrambled data 104 is transferred to the data reproducing circuit 17 in a byte by byte manner every time one pulse of a clock CK is input.

In accordance with a control signal from the MPU 12, the transfer controller 18 receives the data sector 105 read from the semiconductor memory 13 and transfers it to the computer 19.

Figure 6:
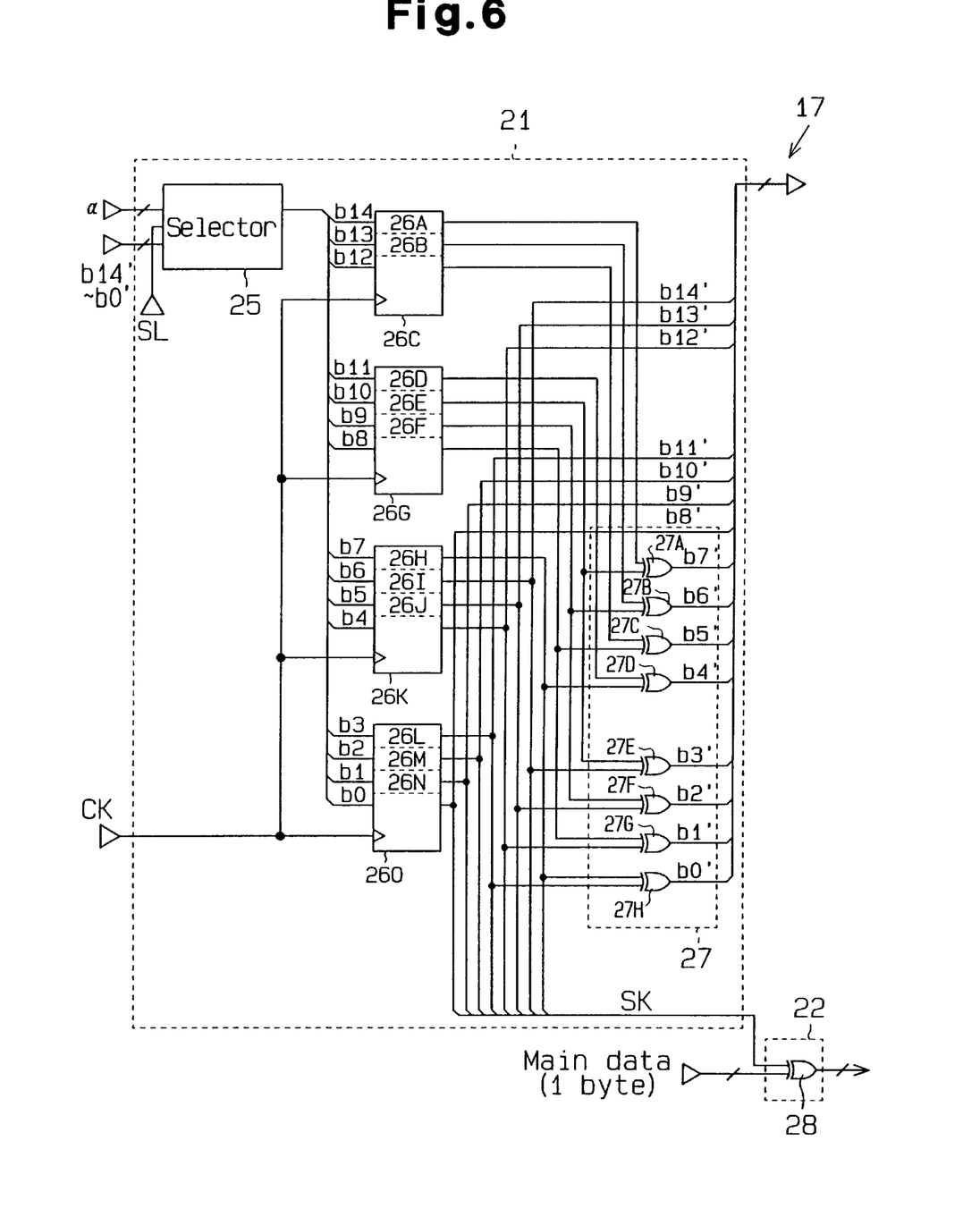
FIG. 6 is a block diagram of a data reproducing circuit according to the first embodiment, which is installed in the DVD drive in FIG. 5.

As shown in FIG. 6, the data reproducing circuit 17 includes a scramble pattern generator 21 and a descrambler 22. The scramble pattern generator 21 generates a scramble pattern for use in descrambling the scrambled data 104. The descrambler 22 descrambles main data using the generated scramble pattern.

The scramble pattern generator 21 includes a selector 25, fifteen data flip-flops (DFFs) 26A to 26O and a logic circuit 27. The logic circuit 27 includes eight EOR gates 27A to 27H.

The selector 25 receives an initial scramble pattern (bits b14–b0), supplied from the data processor 16, and a new scramble pattern (bits b14'–b0') which is generated by the scramble pattern generator 21. The initial scramble pattern is produced by the data processor 16 based on an ID value, which is specified by the bits b7–b4 assigned to the sector number field of an identification data ID (see FIG. 2).

The selector 25 further receives a select signal SL from the MPU 12 and selects either the initial scramble pattern or a new scramble pattern in accordance with the level of the select signal SL to output the selected pattern. According to the first embodiment, the select signal SL having a low (L) level is output in the first descrambling operation, and the select signal SL having a high (H) level is output in the second descrambling operation or any subsequent descrambling operation. The selector 25 selects the initial scramble pattern in response to the L-level select signal SL and selects a new scramble pattern in response to the H-level select signal SL.

The DFFs 26A–26O respectively latch patterns (bits b14–b0 or bits b14'–b0') output from the selector 25 in synchronism with the pulse of the clock CK. The eight DFFs 26H–26O latches an 8-bit scramble value SK (bits b7–b0 or bits b7'–b0') and supplies the value to the descrambler 22. The output bits b6–b0 or b6'–b0' of the seven DFFs 26I–26O are output as bits b14'–b8' of a new scramble pattern from the scramble pattern generator 21.

The EOR gate 27A performs an exclusive OR operation on the output bit b14 or b14' of the DFF 26A and the output bit b10 or b10' of the DFF 26E and outputs the bit b7' of the new scramble pattern. The EOR gate 27B performs an exclusive OR operation on the output bit b13 or b13' of the DFF 26B and the output bit b9 or b9' of the DFF 26F and outputs the bit b6' of the new scramble pattern. The EOR gate 27C performs an exclusive OR operation on the output bit b12 or b12' of the DFF 26C and the output bit b8 or b8' of the DFF 26G and outputs the bit b5' of the new scramble pattern. The EOR gate 27D performs an exclusive OR operation on the output bit b11 or b11' of the DFF 26D and the output bit b7 or b7' of the DFF 26H and outputs the bit b4' of the new scramble pattern. The EOR gate 27E performs an exclusive OR operation on the output bit b10 or b10' of the DFF 26E and the output bit b6 or b6' of the DFF 26I and outputs the bit b3' of the new scramble pattern. The EOR gate 27F performs an exclusive OR operation on the output bit b9 or b9' of the DFF 26F and the output bit b5 or b5' of the DFF 26J and outputs the bit b2' of the new scramble pattern. The EOR gate 27G performs an exclusive OR operation on the output bit b8 or b8' of the DFF 26G and the output bit b4 or b4' of the DFF 26K and outputs the bit b1' of the new scramble pattern. The EOR gate 27H performs an exclusive OR operation on the output bit b7 or b7' of the DFF 26H and the output bit b3 or b3' of the DFF 26L and outputs the bit b0' of the new scramble pattern.

With the above structure, the scramble pattern generator 21 outputs the bits b7–b0 of the initial scramble pattern as an 8-bit scramble value SK in the first descrambling operation. In the second and subsequent descrambling operations, the scramble pattern generator 21 outputs the bits b7'–b0' of a new scramble pattern as an 8-bit scramble value SK.

The following Table 1 shows the bits b14'–b0' of a new scramble pattern, which has been generated using the bits b14–b in the above-discussed manner.

TABLE 1 b14' = b6
b13' = b5
b12' = b4
b11' = b3
b10' = b2
b9' = b1
b8' = b0
b7' = b14 ^ b10
b6' = b13 ^ b9
b5' = b12 ^ b8
b4' = b11 ^ b7
b3' = b10 ^ b6
b2' = b9 ^ b5
b1' = b8 ^ b4
b0' = b7 ^ b3

(^: exclusive OR)

As described above, the scramble pattern generator 21 generates an 8-bit scramble value SK to descramble 1-byte main data every time a single clock pulse is input. The conventional scramble pattern generator 21, which has the feedback type shift register 111, generates an 8-bit scramble value SK every time eight clock pulses are input. The scramble pattern generator 21 according to the first embodiment therefore generates an 8-bit scramble pattern faster than the conventional one. Further, the speed of generating an 8-bit scramble pattern becomes substantially equal to the transfer rate of main data. Consequently, a scramble pattern generator is provided suitable for improving the data transfer rate and fast data processing.

The descrambler 22 includes eight EOR gates 28 (only one shown in FIG. 6). The individual EOR gates 28 receive the respective bits of the 8-bit scramble value SK (the output bits of the DFFs 26H–26A) from the scramble pattern generator 21 and receive the respective bits of 1-byte main data from the data processor 16. Each EOR gate 28 performs an exclusive OR operation on each bit on the scramble value SK and the associated bit of the main data to produce original data.

The operation of the DVD drive 10 will now be discussed. Data read from the disk 100 by the disk drive 15 is subjected to EFM Plus demodulation, yielding recorded sector data 101 (see FIG. 1). The recorded sector data 101 is supplied to the DVD controller 11.

In accordance with another control signal from the MPU 12, the data processor 16 produces the ECC-affixed data 103 from the recorded sector data 101. The data processor 16 also performs error correction of each block sector data 102 using the first and second error correction codes PI and PO included in the ECC-affixed data 103, producing the scrambled data 104.

In the first descrambling operation, the selector 25 selects the initial scramble pattern in response to the L-level select signal SL. At this time, the initial scramble pattern "0001 (h)" generated based on the ID value "0(h)" of the bits b7–b4 in the sector number field is selected for the first block.

The DFFs 26–26O latch the initial scramble pattern (bits b14–b0) from the selector 25 in response to the first clock pulse. The eight DFFs 26H–26O send an 8-bit scramble value SK "00000001(2)" to the descrambler 22. The outputs of the seven DFFs 26I–26O are sent out from the scramble pattern generator 21 as the bits b14'–b8' of a new scramble pattern. The EOR gates 27A–27H output the bits b7'–b0' of the new scramble pattern. In this case, the logic value of the bits b14'–b0' is 000000100000000(2)=0100(h).

The descrambler 22 performs an exclusive OR operation on the 8-bit scramble value SK "00000001(2)" and the 1-byte main data of the scrambled data 104 to produce original byte data.

In the second descrambling operation, the selector 25 selects a new scramble pattern (bits b14'–b0') in response to the H-level select signal SL. The DFFs 26A–26O respectively latch the bits b14'–b0' "000000100000000(2)" in response to the second clock pulse. The eight DFFs 26H–26O outputs the latched 8-bit scramble value SK "00000000(2)". The seven DFFs 26I–26O respectively output the bits b14'–b8' "0000000(2)" of the latched new scramble pattern. The EOR gates 27A–27H output the bits b7'–b0' "0000010(2)" of the new scramble pattern. Therefore, the logic value of the bits b14'–b0' is 000000000000010(2)=0002(h).

The descrambler 22 performs an exclusive OR operation on the 8-bit scramble value SK "00000000(2)" and the next 1-byte main data of the scrambled data 104 to produce original byte data.

In the third descrambling operation or any subsequent descrambling operation, the selector 25 selects a new scramble pattern in response to the H-level select signal SL. The DFFs 26A–26O, the EOR gates 27A–27H and the descrambler 22 perform the same processing as done in the second descrambling operation, thereby generating the original one sector data.

Then, descrambling of the scrambled data 104 of the second and subsequent sectors in the first block is executed. The initial scramble pattern used to descramble data in the first sector is also used to descramble data in the second to sixteenth sectors in the same block. After descrambling of the first block is completed, an initial scramble pattern "5500(h)" is used to descramble data in the second block. Likewise, initial scramble pattern values as shown in FIG. 4 are used in order for descrambling data of the third and subsequent blocks.

A second embodiment of the invention will now be discussed with reference to the accompanying drawings. To avoid redundancy, like or same reference numerals are given to those components that are like or the same as the corresponding components of the first embodiment.

Figure 7:
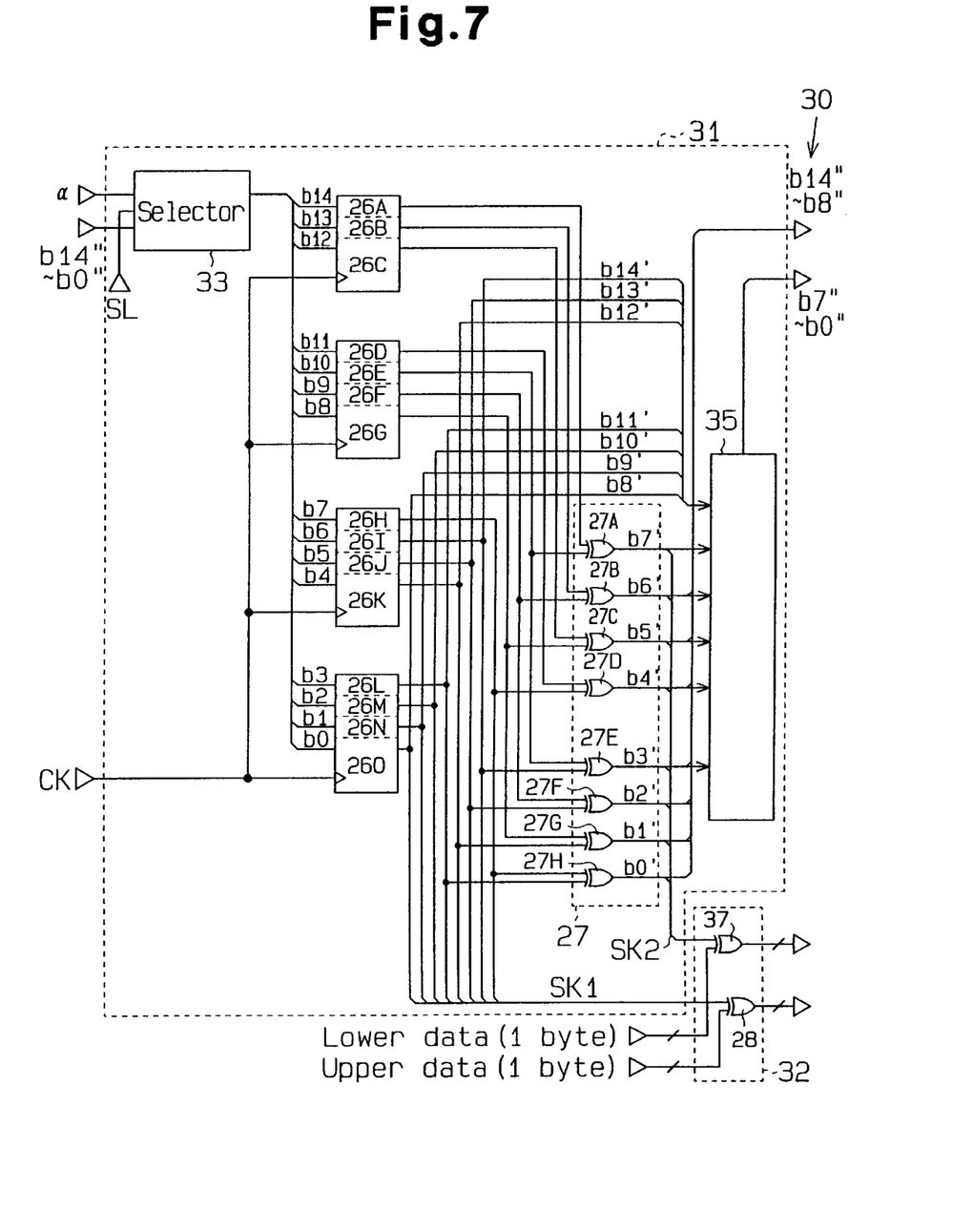
FIG. 7 is a block diagram of a data reproducing circuit according to a second embodiment of the invention.

In the second embodiment, the scrambled data 104 is transferred in the unit of two bytes. Every time one pulse of the clock CK is input, therefore, the data processor 16 transfers upper 1-byte data and lower 1-byte data to a data reproducing circuit 30.

As shown in FIG. 7, the data reproducing circuit 30 according to the second embodiment includes a scramble pattern generator 31 and a descrambler 32. The scramble pattern generator 31 generates a pair of scramble patterns, which are used to descramble 2-byte main data of the scrambled data 104. The descrambler 32 descrambles the 2-byte main data using the pair of scramble patterns.

The scramble pattern generator 31 includes a selector 33, fifteen data DFFs 26A to 26O, a first logic circuit 27 and a second logic circuit 35. The first logic circuit 27 includes eight EOR gates 27A to 27H. The second logic circuit 35, like the first logic circuit 27, includes eight EOR gates.

The selector 33 selects the initial scramble pattern in response to the L-level select signal SL in the first descrambling operation. In the second or any subsequent descrambling operation, the selector 33 selects a new scramble pattern (bits b14"–b0") in response to the H-level select signal SL.

The eight DFFs 26H–26O latch the bits b7–b0 or b7"–b0" in response to the pulse of the clock CK and supplies those bits to the descrambler 32 as an 8-bit scramble value SK1 for descrambling the upper 1-byte data. The EOR gates 27A–27H receive bit values from the associated DFFs and send an 8-bit scramble value SK2 (bits b7'–b0') to the descrambler 32 for descrambling the lower 1-byte data.

The output bits b6–b0 or b6"–b0" of the seven DFFs 26I–26O are supplied as the bits b14'–b8' to the second logic circuit 35. Further, the output bits b7'–b3' of the five EOR gates 27A–27E are supplied to the second logic circuit 35. The second logic circuit 35 receives the bits b14'–b3' and outputs the bits b7"–b0" of a new scramble pattern. The output data b6'–b0' of the seven EOR gates 27B–27H are output as the bits b14"–b8" of the new scramble pattern.

The following Table 2 shows the bits b14"–b0" of a new scramble pattern, which have been generated using the bits b14'–b0' in the above-discussed manner.

TABLE 2 b14" = b6'
b13" = b5'
b12" = b4'
b11" = b3'
b10" = b2'
b9" = b1'
b8" = b0'
b7" = b14' ^ b10'
b6" = b13' ^ b9'
b5" = b12' ^ b8'
b4" = b11' ^ b7'
b3" = b10' ^ b6'
b2" = b9' ^ b5'
b1" = b8' ^ b4'
b0" = b7' ^ b3'

(^: exclusive OR)

As described above, the scramble pattern generator 31 according to the second embodiment generates the 8-bit scramble value SKI for the upper 1-byte data and the 8-bit scramble value SK2 for the lower 1-byte data every time one pulse of the clock CK is input. This embodiment can therefore produce a scramble pattern faster and can make the transfer rate of main data substantially equal to the speed of generating a scramble pattern. This ensure a faster transfer rate of scrambled data. The second logic circuit 35 may be added in accordance with the data transfer in the units of three bytes or the like. In this case, the number of bytes to be descrambled is changed in accordance with the data transfer rate.

The descrambler 32 includes eight EOR gates 28 (only one shown in FIG. 7) and eight EOR gates 37 (only one shown in FIG. 7). The EOR gates 28 receive the 8-bit scramble value SK1 (bits b7–b0) output from the scramble pattern generator 31 and the upper 1-byte data output from the data processor 16. Each of the EOR gates 28 then performs an exclusive OR operation on the received data to generate original upper 1-byte data. The EOR gates 37 receive the 8-bit scramble value SK2 (bits b7'–b0') output from the scramble pattern generator 31 and the lower 1-byte data output from the data processor 16. Each of the EOR gates 37 then performs an exclusive OR operation on the received data to generate original lower 1-byte data.

The operation of the data reproducing circuit 30 will now be discussed. In the first descrambling operation, the selector 33 selects the initial scramble pattern in response to the L-level select signal SL. The DFFs 26A–26O respectively latch the bits b14–b0 of the initial scramble pattern in response to the first clock pulse. The output data of the eight DFFs 26H–26O are supplied to the descrambler 32 as the 8-bit scramble value SK1. The EOR gates 27A–27H receive the output data from the associated DFFs 26A–26L and supply the 8-bit scramble value SK2 to the descrambler 32.

The EOR gates 28 in the descrambler 32 receive the respective bits of the scramble value SK1 and the respective bits of the upper 1-byte of scrambled data and each performs an exclusive OR operation on the received bits to generate original upper 1-byte data. The EOR gates 37 in the descrambler 32 receive the respective bits of the scramble value SK2 and the respective bits of the lower 1-byte of scrambled data and each performs an exclusive OR operation on the received bits to generate original lower 1-byte data.

The output data of the seven EOR gates 27B–27H are output as the bits b14"–b8" of a new scramble pattern. The second logic circuit 35 receives the output bits b14'–b8' from the seven DFFs 26I–26O and the output bits b7'–b3' from the five EOR gates 27A–27E and generates the bits b7"–b0" of the new scramble pattern.

In the second descrambling operation, the selector 33 selects the new scramble pattern (bits b14"–b0") in response to the H-level select signal SL. The DFFs 26A–26O respectively latch the bits b14"–b0" in response to the next clock pulse. The descrambler 32 receives the output data of the eight DFFs 26H–26O as the 8-bit scramble value SK1 and also receives the 8-bit scramble value SK2 from the eight EOR gates 27A–27H. The descrambler 32 descrambles the 2-byte data using the scramble values SK1 and SK2 to generate original 2-byte data. The six EOR gates 27B–27H output the bits b14"–b8" of the new scramble pattern. The second logic circuit 35 outputs the bits b7"–b0" of the new scramble pattern.

In the third descrambling operation or any subsequent descrambling operation, the selector 33, the DFFs 26A–26O, the EOR gates 27A–27H and the descramber 32 perform the same descrambling of 2-byte main data as done in the second descrambling operation, thereby generating the original 2-byte data.

A third embodiment of the invention will now be discussed with reference to the accompanying drawings. To avoid redundancy, like or same reference numerals are given to those components that are like or the same as the corresponding components of the first embodiment.

Figure 8:
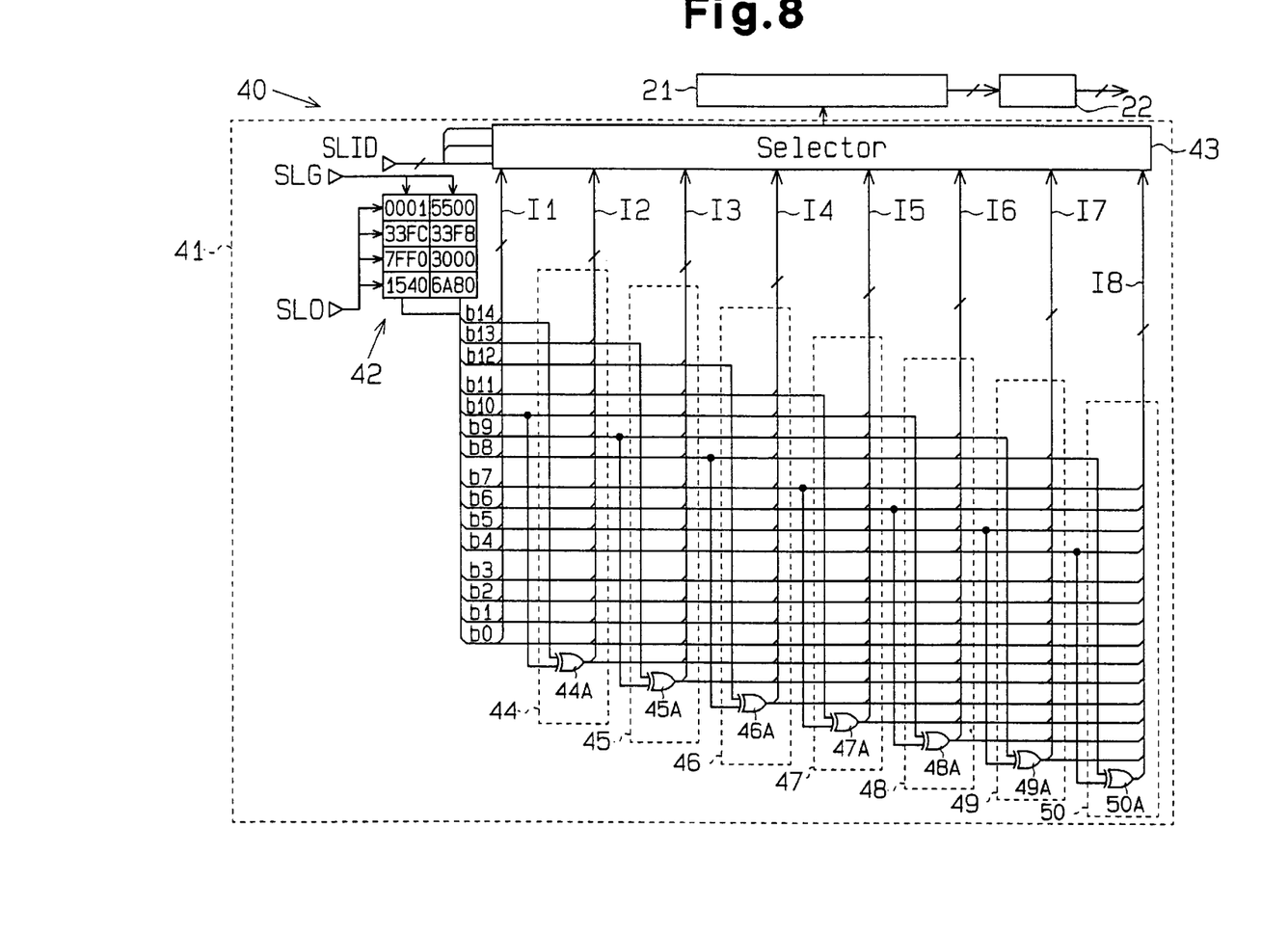
FIG. 8 is a block diagram of a data reproducing circuit according to a third embodiment of the invention.

In the third embodiment, scrambled data 104 is transferred in the unit of one byte. Every time one pulse of the clock CK is input, therefore, 1-byte main data is transferred to a data reproducing circuit 40.

As shown in FIG. 8, the data reproducing circuit 40 according to the third embodiment includes an initial pattern setting circuit 41, a scramble pattern generator 21 and a descrambler 22. The initial pattern setting circuit 41 is configured to store a plurality of initial scramble patterns corresponding to a plurality of data addresses of individual sectors in each block. The initial pattern setting circuit 41 selectively sets the initial scramble pattern which corresponds to the data address at which descrambling should be started.

The scramble pattern generator 21 generates an 8-bit scramble value using the selected initial scramble pattern. The descrambler 22 performs descrambling using this 8-bit scramble value and scrambled data at a specific address. This scheme therefore shortens the time for generating a scramble pattern for the scrambled data that is located at an arbitrary data address. In other words, it is possible to acquire original data from the scrambled data located at an arbitrary data address. This is effective in accomplishing fast data processing.

Figure 9:
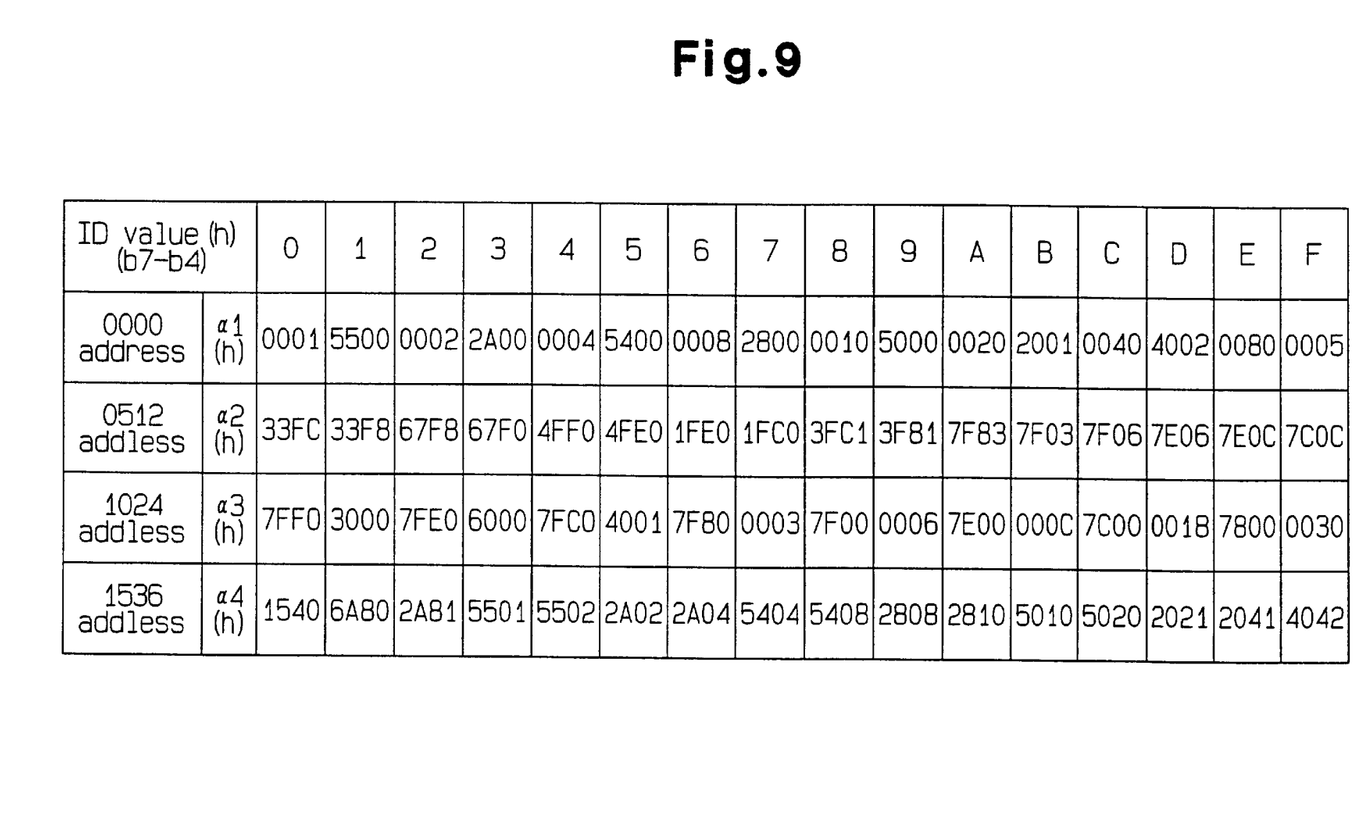
FIG. 9 shows an initial scramble pattern used in the data reproducing circuit according to the third embodiment of the invention.

FIG. 9 presents a table showing initial scramble patterns according to the third embodiment. Four initial scramble patterns 1 to 4 are set for the ID values of the bits b7–b4, which are assigned to the sector number field in one block. The four initial scramble patterns 1–4 correspond to four addresses of a data sector. The address of main data of the first byte in the data sector is expressed by "0000". The other three addresses are given by offset values with the address "0000" taken as a reference.

In the third embodiment, ID values are separated into first and second groups. The first group consists of an ID value of 0(h), ID value of 2(h), ID value of 4(h), ID value of 6(h), ID value of 8(h), ID value of A(h), ID value of C(h), and ID value of E(h). The second group consists of an ID value of 1(h), ID value of 3(h), ID value of 5(h), ID value of 7(h), ID value of 9(h), ID value of B(h), ID value of D(h), and ID value of F(h).

The ID value of 0(h) and ID value of 2(h) in the first group has the following relationship. The initial scramble pattern 1 (0001(h)) is "000000000000001(2)". The bits b13–b0 are shifted one bit upward, and a logic value generated by an exclusive OR operation on the bit b14 (0) and the bit b10 (0) is set in the bit b0, thus generating 000000000000010(2)= 0002(h). This value is equal to the initial scramble pattern 1 (0002(h)) corresponding to the ID value of 2(h).

In the same manner as discussed above, 67F8(h), 7FE0(h) and 2A81(h) are produced respectively from the initial scramble patterns 2 (33FC(h)), 3 (7FF0(h)) and 4 (1540(h)). Those values are respectively equal to the initial scramble patterns 2, 3 and 4 corresponding to the ID value of 2(h).

The ID value of 2(h) and ID value of4(h), the ID value of 4(h) and ID value of 6(h), the ID value of 6(h) and ID value of 8(h), the ID value of 8(h) and ID value of A(h), the ID value of A(h) and ID value of C(h), and the ID value of C(h) and ID value of E(h), based on the initial scramble patterns 1–4, have similar relationships.

In the second group, 2A00(h), 67F0(h), 6000(h) and 5501(h) are produced respectively from the initial scramble patterns 1 (5500(h)), 2 (33F8(h)), 3 (3000(h)) and 4 (6A80 (h)), in the same manner as done for the first group. Those values are respectively equal to the initial scramble patterns 1 to 4 corresponding to the ID value of 3(h).

The ID value of 3(h) and ID value of 5(h), the ID value of 5(h) and ID value of 7(h), the ID value of 7(h) and ID value of 9(h), the ID value of 9(h) and ID value of B(h), the ID value of B(h) and ID value of D(h), and the ID value of D(h) and ID value of F(h), based on the initial scramble patterns 1–4, have similar relationships.

Referring again to FIG. 8, the initial pattern setting circuit 41 includes first and second selectors 42 and 43, and seven shift circuits 44 to 50. The first selector 42 has eight memory areas. The four initial scramble patterns 0001(h), 33FC(h), 7FF0(h) and 1540(h) corresponding to the ID value of 0(h) are respectively stored in the four of the eight memory areas. The four initial scramble patterns 5500(h), 33F8(h), 3000(h) and 6A80(h) corresponding to the ID value of 1(h) are respectively stored in the remaining four memory areas.

The first selector 42 receives a group select signal SLG from the data processor 16 and an offset select signal SLO from the MPU 12. The first selector 42 then selects one of the eight initial scramble patterns in accordance with the group select signal SLG and the offset select signal SLO. The bits b14–b0 of the selected initial scramble pattern are output as a first signal group I1 from the first selector 42.

The group select signal SLG indicates the value of the bit b4 assigned to the sector number field. When the group select signal SLG is "0", the initial scramble patterns 0001(h), 33FC(h), 7FF0(h) and 1540(h) corresponding to the ID value of 0(h) are available selections, i.e., candidates to be selected. When the group select signal SLG is "1", the initial scramble patterns 5500(h), 33F8(h), 3000(h) and 6A80(h) corresponding to the ID value of 1(h) are available selections.

The offset select signal SLO indicates an offset value of a data address. When the offset value of data lies in the range of addresses 0000 to 0511, available selections are the initial scramble patterns 0001(h) and 5500(h). When the offset value of data lies in the range of addresses 0512 to 1023, available selections are the initial scramble patterns 33FC(h) and 33F8(h). When the offset value of data lies in the range of addresses 1024 to 1535, available selections are the initial scramble patterns 7FF0(h) and 3000(h). When the offset value of data lies in the range of addresses 1536 to 2047, available selections are the initial scramble patterns 1540(h) and 6A80(h).

When the group select signal SLG is "0" and the offset value of data is the address 0513 in the first descrambling operation, the first selector 42 selects and outputs the initial scramble pattern 33FC(h) corresponding to the ID value of 0(h).

When receiving the initial scramble pattern 33FC(h) from the first selector 42, the individual shift circuits 44–50 supply second to eighth signal groups I2 to I8 (67F8(h), 4FF0(h), 1FE0(h), 3FC1(h), 7F83(h), 7F06(h) and 7E0C(h)) to the second selector 43. In this case, the second to eighth signal groups I2–I8 respectively correspond to the ID value of 2(h), the ID value of 4(h), the ID value of 6(h), the ID value of 8(h), the ID value of A(h), the ID value of C(h) and the ID value of E(h) in the first group.

The shift circuit 44 includes an EOR gate 44A, which receives the bits b14 and b10 in the first signal group I1 from the first selector 42. The shift circuit 44 is configured to perform an exclusive OR operation on both bits to supply the second signal group I2 to the second selector 43. The second signal group I2 includes new bits b14–b1, obtained by shifting the bits b13–b0 in the first signal group I1 upward by one bit, and a new bit b0 equivalent to the output signal of the EOR gate 44A.

The shift circuit 45 includes an EOR gate 45A, which receives the bits b13 and b9 in the first signal group I1. The shift circuit 45 is configured to perform an exclusive OR operation on both bits to supply the third signal group I3 to the second selector 43. The third signal group I3 includes new bits b14–b2, acquired by shifting the bits b12–b0 in the first signal group Ii upward by two bits, a new bit b1 equivalent to the output signal of the EOR gate 44A, and a new bit b0 equivalent to the output signal of the EOR gate 45A.

The shift circuit 46 includes an EOR gate 46A, which receives the bits b12 and b8 in the first signal group I1. The shift circuit 46 is configured to perform an exclusive OR operation on both bits to supply the fourth signal group I4 to the second selector 43. The fourth signal group I4 includes new bits b14–b3, acquired by shifting the bits b11–b0 in the first signal group I1 upward by three bits, new bits b2 and b1 equivalent to the output signals of the EOR gates 44A and 45A, and a new bit b0 equivalent to the output signal of the EOR gate 46A.

The shift circuit 47 includes an EOR gate 47A, which receives the bits b11 and b7 in the first signal group I1. The shift circuit 47 is configured to perform an exclusive OR operation on both bits to supply the fifth signal group I5 to the second selector 43. The fifth signal group I5 includes new bits b14–b4, acquired by shifting the bits b10–b0 in the first signal group I1 upward by four bits, new bits b3, b2 and b1 equivalent to the output signals of the EOR gates 44A, 45A and 46A, and a new bit b0 equivalent to the output signal of the EOR gate 47A.

The shift circuit 48 includes an EOR gate 48A, which receives the bits b10 and b6 in the first signal group I1. The shift circuit 48 is configured to perform an exclusive OR operation on both bits to supply the sixth signal group I6 to the second selector 43. The sixth signal group I6 includes new bits b14–b5, acquired by shifting the bits b9–b0 in the first signal group I1 upward by five bits, new bits b4, b3, b2 and b1 equivalent to the output signals of the EOR gates 44A, 45A, 46A and 47A, and a new bit b0 equivalent to the output signal of the EOR gate 48A.

The shift circuit 49 includes an EOR gate 49A, which receives the bits b9 and b5 in the first signal group I1. The shift circuit 49 is configured to perform an exclusive OR operation on both bits to supply the seventh signal group I7 to the second selector 43. The seventh signal group I7 includes new bits b14–b6, acquired by shifting the bits b8–b0 in the first signal group I1 upward by sixth bits, new bits b5, b4, b3, b2 and b1 equivalent to the output signals of the EOR gates 44A, 45A, 46A, 47A and 48A, and a new bit b0 equivalent to the output signal of the EOR gate 49A.

The shift circuit 50 includes an EOR gate 50A, which receives the bits b8 and b4 in the first signal group I1. The shift circuit 50 is configured to perform an exclusive OR operation on both bits to supply the eighth signal group I8 to the second selector 43. The eighth signal group I8 includes new bits b14–b7, acquired by shifting the bits b7–b0 in the first signal group I1 upward by seven bits, new bits b6, b5, b4, b3, b2 and b1 equivalent to the output signals of the EOR gates 44A, 45A, 46A, 47A, 48A and 49A, and a new bit b0 equivalent to the output signal of the EOR gate 50A.

The second selector receives the first to eighth signal groups I1 to I8 and selects one of them in accordance with a signal group select signal SLID of 3-bits supplied from the data processor 16. The selected signal group is supplied to the scramble pattern generator 21. The signal group select signal SLID is a 3-bit signal for the bits b7–b5 assigned to the sector number field.

The following Table 3 shows the correlation between the first to eighth signal groups I1–I8 and eight signal group select signals SLID as combinations of three bits.

TABLE 3

| SLID | | | Signal group |
|---|---|---|---|
| b7 | b6 | b5 | to be selected |
| 0 | 0 | 0 | I1 |
| 0 | 0 | 1 | I2 |
| 0 | 1 | 0 | I3 |
| 0 | 1 | 1 | I4 |
| 1 | 0 | 0 | I5 |
| 1 | 0 | 1 | I6 |
| 1 | 1 | 0 | I7 |
| 1 | 1 | 1 | I8 |

At the descrambling time, when the offset value of scrambled data that corresponds to the ID value of 0(h) is at the address 0513, the first selector 42 selects the initial scramble pattern 33FC(h). At this time, the signal group select signal SLID is "000" based on the ID value of 0(h). The second selector 43 selects the first signal group I1 (33FC(h)) according to the signal group select signal SLID of "000".

The scramble pattern generator 21 receives the selected signal group from the second selector 43 as the initial scramble pattern and produces an 8-bit scramble value. To descramble scrambled data located at the address 0513 corresponding to the ID value of 0(h), for example, the initial scramble pattern "33FC(h)" is selected. The scramble pattern generator 21 generates an 8-bit scramble value in response to the second pulse of the clock CK. This is because data to be descrambled first is located at the address 0513, which is greater by one than the address 0512 corresponding to the initial scramble pattern "33FC(h)". The descrambler 22 receives an 8-bit scramble value and scrambled data at the address 0513 and descrambles it to produce original data.

Although several embodiments of the present invention have been described herein, it should be apparent to those skilled in the art that the present invention may be embodied in many other specific forms without departing from the spirit or scope of the invention. Particularly, it should be understood that the invention may be embodied in the following forms.

This invention is not limited to a scramble pattern generator used in a read-only DVD drive to descramble data, but may be adapted to a scramble pattern generator used in an apparatus for writing data on a disk to scramble data to be written.

Therefore, the present examples and embodiments are to be considered as illustrative and not restrictive and the invention is not to be limited to the details given herein, but may be modified within the scope and equivalence of the appended claims.

What is claimed is:

1. A method of generating original data by descrambling scrambled data using predetermined scramble patterns, said scrambled data being separated into a plurality of data groups each including plural pieces of scrambled unit data including first and second scrambled unit data, wherein initial scramble patterns are respectively assigned to said data groups, said method comprising the steps of:

(a) preparing an initial scramble pattern assigned to a specific data group;

(b) generating a first plurality of scramble patterns including first and second scramble patterns in one clock cycle using said prepared initial scramble pattern;

(c) preparing plural pieces of scrambled unit data including first and second ones of said scrambled unit data pieces in said specific data group; and (d) performing a first plurality of descrambling operations including first and second descrambling operations to substantially simultaneously produce plural pieces of original data including first and second original data pieces, wherein said first descrambling operation is performed using said first scramble pattern and said first scrambled unit data piece to produce said first original data piece, said second descrambling operation is performed using said second scramble pattern and said second scrambled unit data piece to produce said second original data piece, and wherein each of said plural pieces of scrambled unit data is transferred in a unit of two bytes per clock cycle.

2. The method according to claim 1, wherein said step (d) includes a step of performing a first plurality of exclusive OR operations including first and second exclusive OR operations to substantially simultaneously produce the original data pieces including said first and second original data pieces, wherein said first exclusive OR operation is performed using said first scramble pattern and said first scrambled unit data piece to produce said first original data piece, and wherein said second exclusive OR operation is performed using said second scramble pattern and said second scrambled unit data piece to produce said second original data piece.

3. The method according to claim 1, further comprising the steps of:

(e) generating a second plurality of scramble patterns including third and fourth scramble patterns in a next one clock cycle using said first plurality of scramble patterns;

(f) preparing next plural pieces of scrambled unit data including third and fourth scrambled unit data pieces in said specific data group; and (g) performing a second plurality of descrambling operations including third and fourth descrambling operations to substantially simultaneously produce plural pieces of original data including third and fourth data pieces, wherein said third descrambling operation is performed using said third scramble pattern and said third scrambled unit data piece to produce said third original data piece, and wherein said fourth descrambling operation is performed using said fourth scramble pattern and said fourth scrambled unit data piece to produce said fourth original data piece.

4. The method according to claim 3, wherein said step (g) includes a step of performing a second plurality of exclusive OR operations including third and fourth exclusive OR operations to substantially simultaneously produce plural pieces of original data including said third and fourth original data pieces, wherein said third exclusive OR operation is performed using said third scramble pattern and said third scrambled unit data piece to produce said third original data piece, and wherein said fourth exclusive OR operation is performed using said fourth scramble pattern and said fourth scrambled unit data piece to produce said fourth original data piece.

5. A method of generating original data by descrambling scrambled data using predetermined scramble patterns, said scrambled data being separate into a plurality of data groups each including plural pieces of scrambled unit data, wherein a position for each of said pieces of scrambled unit data in one data group is defined, a plurality of initial scramble patterns being respectively assigned to predetermined selected positions in one data group, said method comprising the steps of:

(a) specifying a first position for one scrambled unit data in a data group, said first position being a position at which descrambling one scrambled unit data piece is started;

(b) selecting one initial scramble pattern, associated with said specified first position, in said plurality of initial scramble patterns;

(c) generating a first scramble pattern using said selected one initial scramble pattern;

(d) preparing one scrambled unit data piece corresponding to said specified first position; and (e) performing a descrambling operation using said first scramble pattern and said prepared one scrambled unit data piece to produce an original data piece, and wherein said pieces of scrambled unit data are transferred in a unit of two bytes per clock cycle.

6. The method according to claim 5, wherein said step (e) includes a step of performing an exclusive OR operation on said first scramble pattern and said prepared one scrambled unit data piece to produce the original data piece.

7. The method according to claim 6, wherein said plurality of initial scramble patterns include four initial scramble patterns, each corresponding to one of four positions for four scrambled unit data pieces in one data group.

8. The method according to claim 5, further comprising the steps of:

(f) generating a second scramble pattern using said first scramble pattern;

(g) preparing a next one scrambled unit data piece corresponding to a second position following said first position; and (h) performing a descrambling operation using said second scramble pattern and said prepared next one scrambled unit data piece to produce a next original data piece.

9. The method according to claim 8, wherein said step (h) includes a step of performing an exclusive OR operation on said second scramble pattern and said prepared next one scrambled unit data piece to produce the next original data piece.

10. The method according to claim 5, wherein said step (c) includes a step of generating the first scramble pattern using said selected one initial scramble pattern in one clock cycle, and wherein said step (e) includes a step of performing a descrambling operation using said first scramble pattern and said prepared one scrambled unit data piece to produce the original data in one clock cycle.

11. The method according to claim 10, wherein said step (e) includes a step of performing an exclusive OR operation on said first scramble pattern and said prepared one scrambled unit data piece to produce the original data piece.

12. A circuit for generating scramble patterns used in descrambling scrambled data, said scrambled data being separated into a plurality of data groups, initial scramble patterns being respectively assigned to said data groups, said circuit comprising:

a plurality of registers for receiving an initial scramble pattern assigned to a specific data group and for temporarily holding said initial scramble pattern to output said initial scramble pattern as a first scramble pattern;

a first logic circuit, coupled to said plurality of registers, for receiving said first scramble pattern to generate a second scramble pattern and for providing said second scramble pattern to said plurality of registers, wherein said plurality of registers selectively receives one of said initial scramble pattern and said second scramble pattern and outputs the selected pattern as said first scramble pattern; and a second logic circuit, coupled to said first logic circuit, for receiving said second scramble pattern from said first logic circuit and generating a third scramble pattern and for providing said third scramble pattern to said plurality of registers.

13. The circuit according to claim 12, further comprising a selector, coupled between said plurality of registers and said first logic circuit, for receiving said initial scramble pattern to be provided to said plurality of registers and for receiving said second scramble pattern provided from said first logic circuit to selectively provide one of said initial scramble pattern and said second scramble pattern to said plurality of registers in accordance with a selection signal.

14. The circuit according to claim 12, further comprising a selector, coupled between said plurality of registers and said first and second logic circuits, for receiving said initial scramble pattern to be provided to said plurality of registers, said second scramble pattern provided from said first logic circuit and said third scramble pattern provided from said second logic circuit to selectively provide one of said initial scramble pattern and said second and third scramble patterns in accordance with a selection signal.

15. The circuit according to claim 12, wherein said scrambled data is recorded on a recording medium.

16. A disk apparatus comprising:

a circuit for generating scramble patterns used in descrambling scrambled data, said scrambled data being separated into a plurality of data groups, initial scramble patterns being respectively assigned to said data groups, said circuit including:

a plurality of registers for receiving an initial scramble pattern assigned to a specific data group and for temporarily holding said initial scramble pattern to output said initial scramble pattern as a first scramble pattern;

a first logic circuit, coupled to said plurality of registers, for receiving said first scramble pattern to generate a second scramble pattern and for providing said second scramble pattern to said plurality of registers, wherein said plurality of registers selectively receives one of said initial scramble pattern and said second scramble pattern and outputs the selected pattern as said first scramble pattern; and a second logic circuit, coupled to said first logic circuit, for receiving said second scramble pattern from said first logic circuit and generating a third scramble pattern and for providing said third scramble pattern to said plurality of registers;

a data processing apparatus for providing said initial scramble pattern to said plurality of registers; and a descramble circuit, coupled to said data processing apparatus and said plurality of registers, for receiving said scrambled data and said first scramble pattern and for performing a descrambling operation using said scrambled data and said first scramble pattern to produce original data.

17. The disk apparatus according to claim 16, wherein said descramble circuit is an exclusive OR circuit.

18. A circuit for generating scramble patterns used in descrambling scrambled data, said scrambled data being separated into a plurality of data groups, each including plural pieces of scrambled unit data, a position for each of said plural pieces of scrambled unit data in one data group being defined, a plurality of initial scramble patterns being respectively assigned to predetermined selected positions in one data group, said circuit comprising:

- a first selector for receiving a plurality of initial scramble patterns associated with at least one data group and for selecting one initial scramble pattern in response to a signal indicative of a first position specified for one scrambled unit data in a data group;
- a plurality of shift circuits, coupled to said first selector, for receiving said selected initial scramble pattern and for generating said plurality of initial scramble patterns respectively associated with said plurality of data groups;
- a second selector, coupled to said first selector and said plurality of shift circuits, for receiving said selected initial scramble pattern from said first selector and said plurality of initial scramble patterns from said plurality of shift circuits and for selecting one initial scramble pattern in response to a signal indicative of a specific data groups;
- a scramble pattern generating circuit, coupled to said first selector, for generating scramble patterns, said scramble pattern generating circuit including:
  - a plurality of registers for receiving the one selected initial scramble pattern from said first selector and for temporarily holding said initial scramble pattern and outputting said temporarily stored initial scramble a pattern as a first scramble pattern; and
  - a first logic circuit, coupled to said plurality of registers, for receiving said first scramble pattern and generating a second scramble pattern and for providing said second scramble pattern to said plurality of registers, wherein said plurality of registers selectively receives one of said initial scramble pattern and said second scramble pattern and outputs said selected pattern as said first scramble pattern; and
- a descramble circuit, coupled to said scramble pattern generating circuit, for receiving said scrambled data and said first scramble pattern and for performing a descrambling operation using said scrambled data and said first scramble pattern to produce original data.

* * * * *